(12) United States Patent
Bourque et al.

(10) Patent No.: US 6,920,719 B2
(45) Date of Patent: Jul. 26, 2005

(54) SLIDING CLOSURE PANEL ASSEMBLY FEATURING SINGLE SUPPORT RAIL

(75) Inventors: Jeffrey Gerard Bourque, Novi, MI (US); Paul Joseph Kolokowski, Southgate, MI (US); Michael James Lesle, Toledo, OH (US); Larry R. Lyke, Novi, MI (US); Thomas William Peyton, Jr., Allen Park, MI (US); Scott Saxon, Northville, MI (US); Marcus Tanksley, Farmington Hills, MI (US); Rick Mark Weinert, Novi, MI (US)

(73) Assignee: Visteon Global Technologies, Inc, Van Buren Township, MI (US)

( * ) Notice: Subject to any disclaimer, the term of this patent is extended or adjusted under 35 U.S.C. 154(b) by 0 days.

(21) Appl. No.: 10/724,460

(22) Filed: Nov. 26, 2003

(65) Prior Publication Data

US 2004/0144034 A1 Jul. 29, 2004

Related U.S. Application Data

(60) Provisional application No. 60/429,804, filed on Nov. 27, 2002.

(51) Int. Cl.$^7$ .............................................. E05D 15/06
(52) U.S. Cl. .............................. 49/413; 49/209; 49/158
(58) Field of Search ......................... 49/379, 413, 449, 49/209, 158, 149, 130

(56) References Cited

U.S. PATENT DOCUMENTS

| | | | |
|---|---|---|---|
| 330,203 A | * | 11/1885 | Brickner ...................... 49/158 |
| 349,268 A | | 9/1886 | Becker |
| 766,253 A | | 8/1904 | Howe |
| 1,275,531 A | | 8/1918 | Clews |
| 1,308,993 A | | 7/1919 | Ridington |
| 1,363,376 A | | 12/1920 | Thommen |
| 1,375,914 A | | 4/1921 | Kimbark |
| 1,384,904 A | | 7/1921 | Lattimore |
| 1,388,091 A | | 8/1921 | Bresnahan |
| 1,509,450 A | | 9/1924 | Sweeney |
| 1,569,118 A | | 1/1926 | Curtis |
| 1,593,324 A | | 7/1926 | Anderson |
| 1,595,274 A | | 8/1926 | White |
| 1,684,636 A | | 9/1928 | Mendenhall |
| 1,721,223 A | | 7/1929 | Kern |
| 1,859,392 A | | 5/1932 | Harper |
| 1,904,986 A | | 4/1933 | Bredin |
| 1,969,521 A | | 8/1934 | Oman |
| 2,140,890 A | * | 12/1938 | Waitekaites .................. 49/158 |
| 2,530,724 A | | 11/1950 | Pierson |
| 2,629,466 A | | 2/1953 | Nardulli |
| 2,760,568 A | | 8/1956 | Smiraldo |

(Continued)

FOREIGN PATENT DOCUMENTS

| | | |
|---|---|---|
| GB | 2 106 574 A | 4/1983 |
| GB | 2 209 787 A | 5/1989 |
| GB | 2 229 479 A | 9/1990 |
| GB | 2 230 042 A | 10/1990 |

Primary Examiner—Gregory J. Strimbu
(74) Attorney, Agent, or Firm—Brinks Hofer Gilson & Lione

(57) ABSTRACT

A closure panel assembly includes a movable or "sliding" panel that is supported for sliding movement along a first direction by a guide rail disposed above an opening defined in a stationary or "fixed" panel. The guide rail includes an engagement portion that overhangs an upper portion of one face of the sliding panel. The overhanging engagement portion of the guide rail limits the relative movement of the upper portion of the sliding panel in a second direction perpendicular to the first direction, while further limiting a pivoting motion of the lower portion of the sliding panel in the second direction. A latch is operative to urge the lower portion of the sliding panel towards the fixed panel, whereupon the sliding panel pivots proximate to the guide rail into a closed position while also compressing a seal disposed between the sliding panel and the fixed panel.

5 Claims, 2 Drawing Sheets

U.S. PATENT DOCUMENTS

| | | | |
|---|---|---|---|
| 2,877,049 A | | 3/1959 | Lucas |
| 3,130,456 A | | 4/1964 | Migneault et al. |
| 3,189,390 A | | 6/1965 | Elliott |
| 3,264,032 A | | 8/1966 | Smith |
| 3,429,070 A | * | 2/1969 | Hurst .................... 49/158 |
| 3,698,883 A | | 10/1972 | Fazio |
| 3,769,749 A | * | 11/1973 | Makela .................. 49/130 |
| 3,789,548 A | * | 2/1974 | Campisano ............. 49/162 |
| 3,805,872 A | | 4/1974 | Lorber |
| 3,902,752 A | | 9/1975 | Pelletier |
| 4,102,545 A | | 7/1978 | Jay |
| 4,119,341 A | | 10/1978 | Cook |
| 4,124,054 A | | 11/1978 | Spretnjak |
| 4,227,725 A | | 10/1980 | Lindquist et al. |
| 4,274,666 A | | 6/1981 | Peck |
| 4,304,429 A | | 12/1981 | Gist |
| 4,314,719 A | | 2/1982 | Hawkins |
| 4,317,312 A | * | 3/1982 | Heideman ............... 49/220 |
| 4,393,753 A | | 7/1983 | Chatlos |
| 4,457,106 A | * | 7/1984 | Forquer .................. 49/158 |
| 4,486,980 A | * | 12/1984 | O'Bar ..................... 49/449 |
| 4,497,515 A | | 2/1985 | Appelson |
| 4,571,888 A | | 2/1986 | Jensen |
| 4,707,018 A | | 11/1987 | Gavagan |
| 4,730,413 A | | 3/1988 | Henry |
| 4,758,043 A | | 7/1988 | Reynaldos |
| 4,911,348 A | | 3/1990 | Rasor et al. |
| 4,934,098 A | | 6/1990 | Prouteau et al. |
| 4,936,368 A | | 6/1990 | Philbeck et al. |
| 5,129,678 A | | 7/1992 | Gurbacki |
| 5,192,112 A | | 3/1993 | Gherardi et al. |
| D354,937 S | | 1/1995 | Netwich |
| 5,467,557 A | | 11/1995 | Jones |
| 5,469,906 A | | 11/1995 | Cason |
| 5,473,840 A | | 12/1995 | Gillen et al. |
| 5,505,023 A | | 4/1996 | Gillen et al. |
| 5,522,191 A | | 6/1996 | Wenner et al. |
| 5,542,214 A | | 8/1996 | Buening |
| 5,566,505 A | * | 10/1996 | Kamezaki ............... 49/225 |
| 5,613,323 A | | 3/1997 | Buening |
| 5,724,771 A | | 3/1998 | Gipson |
| 5,771,637 A | | 6/1998 | Oikawa et al. |
| 5,799,444 A | * | 9/1998 | Freimark et al. ......... 49/413 |
| 6,016,861 A | | 1/2000 | Davis |
| 6,018,913 A | | 2/2000 | Lin |
| 6,125,585 A | | 10/2000 | Koneval et al. |
| 6,240,996 B1 | | 6/2001 | Runions |
| 6,260,905 B1 | | 7/2001 | Wagner |
| 6,276,426 B1 | | 8/2001 | Polak |
| 6,305,125 B1 | | 10/2001 | Nozaki et al. |
| 6,315,327 B1 | | 11/2001 | Woolsey |
| 6,526,708 B1 | | 3/2003 | Hartley et al. |
| 6,591,552 B1 | | 7/2003 | Rasmussen |
| 2002/0148163 A1 | | 10/2002 | Warner et al. |
| 2003/0137161 A1 | | 7/2003 | Gillen |

* cited by examiner

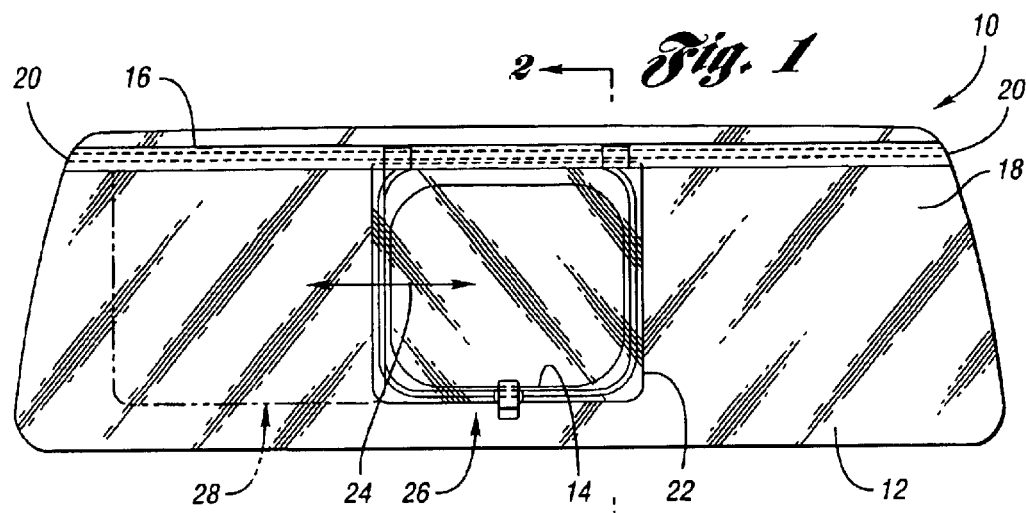
Fig. 1
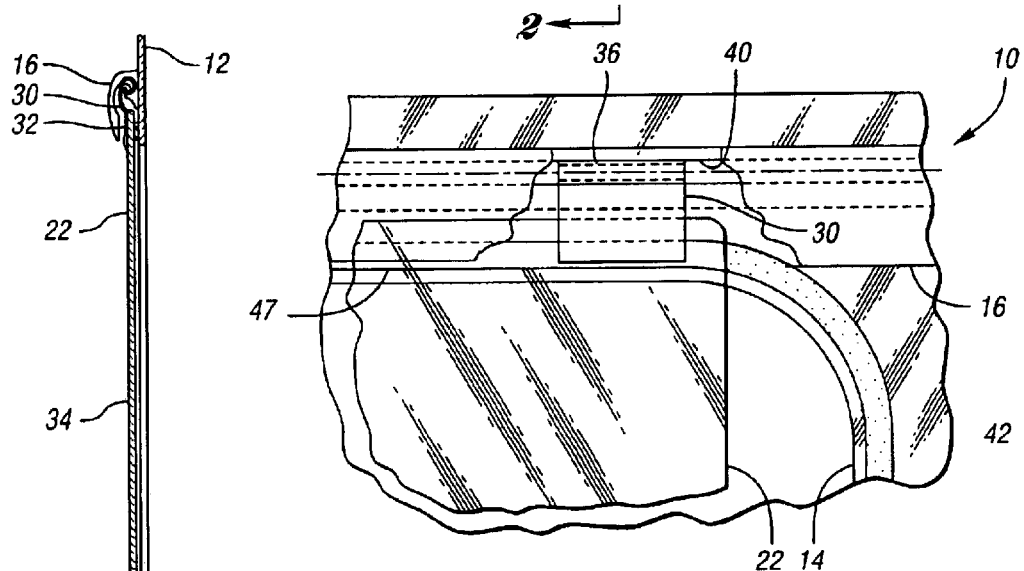
Fig. 3
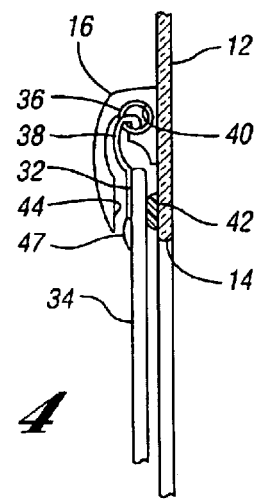
Fig. 2
Fig. 4

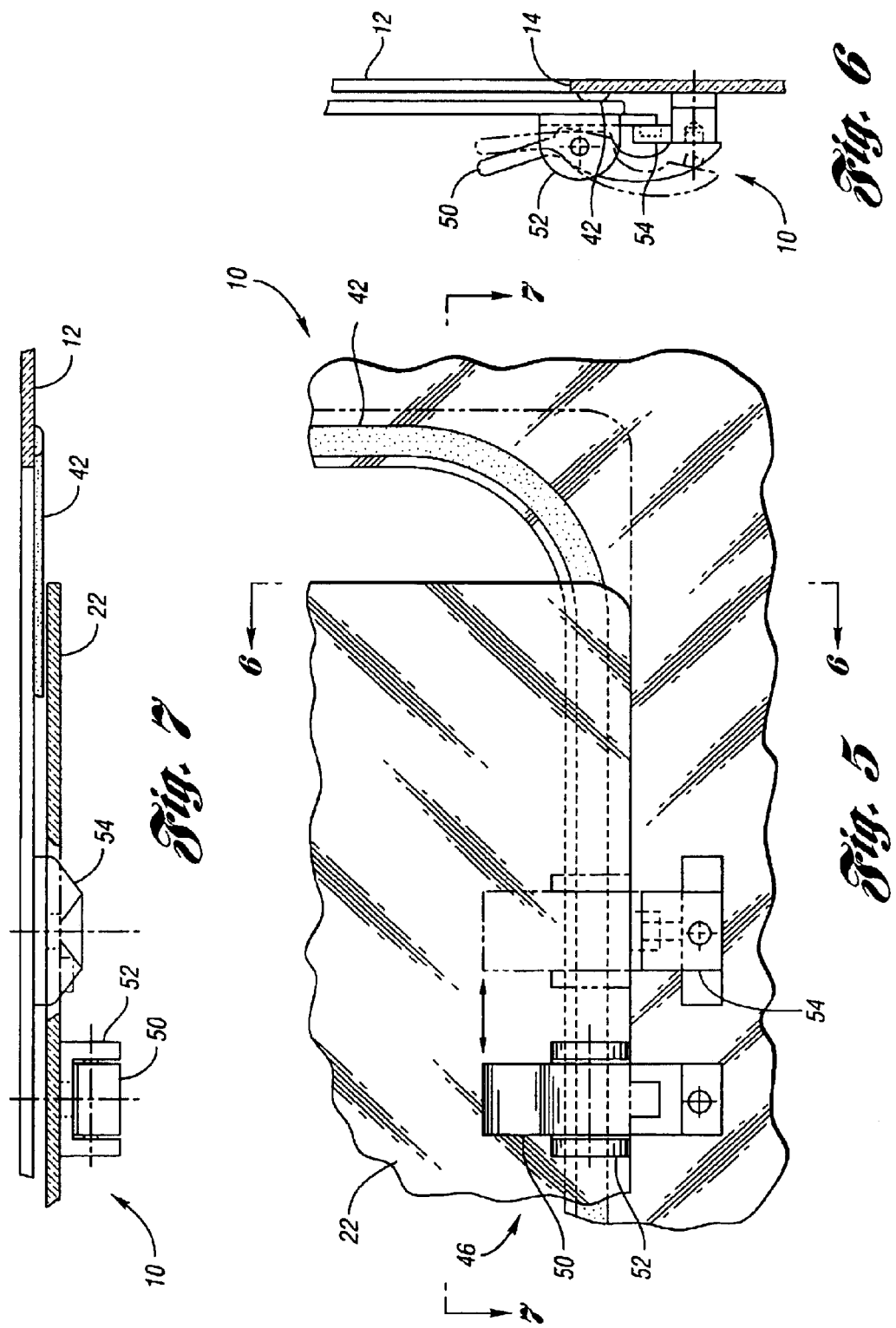

SLIDING CLOSURE PANEL ASSEMBLY FEATURING SINGLE SUPPORT RAIL

CROSS-REFERENCE TO RELATED APPLICATIONS

This application claims benefit of U.S. provisional patent application No. 60/429,804, filed Nov. 27, 2002, the disclosure of which is hereby incorporated herein by reference.

FIELD OF THE INVENTION

The invention relates generally to a closure panel assembly in which a movable or "sliding" panel is urged against a stationary or "fixed" panel to thereby compress an air or moisture seal disposed between opposed surfaces on the sliding panel and the fixed panel.

BACKGROUND OF THE INVENTION

A closure panel assembly, as is typically employed to define a rearward-facing window or "backlite" for a passenger compartment of a light truck, generally includes a fixed glass panel in which an opening is defined, and a sliding glass panel that moves along a pair of support or guide rails between a closed position and an open position relative to the opening. A compression seal is disposed between the fixed and sliding panels, for example, by mounting the seal about the periphery of the opening in the fixed panel. A lateral force exerted on the sliding panel by the guide rails ensures that the seal is compressed sufficiently to resist leakage of air and/or water between the fixed panel and the sliding panel when the sliding panel is moved to the closed position. Unfortunately, the lateral force exerted on the sliding panel by the guide rails, and the resulting continuous contact between the sliding panel and the seal, typically generates a friction drag that resists free and easy movement of the sliding panel across the surface of the seal, thereby making it more difficult for a vehicle passenger to move the sliding panel between the closed and open positions.

Additionally, because the lower guide rail of known dual rail assemblies has a tendency to collect water which can inhibit the function of the sliding panel, for example, upon freezing, such assemblies also typically include a water management system to direct water from within the lower guide rail to a location the outside of the vehicle. Such water management systems, in turn, increase costs for assembly manufacture What is needed is a means to incorporate a feature into the sliding panel and/or a guide rail to effect a desired compression of the seal disposed between the sliding panel and the fixed panel when the sliding panel is in the closed position, yet allow for sufficient unloading of the seal when the sliding panel is in the open position such that relatively free and easy sliding motion is effected.

BRIEF SUMMARY OF THE INVENTION

According to the invention, a closure panel assembly, for example, for closing a window opening defined in a motor vehicle or other enclosure, includes a sliding panel that is supported by a guide rail so as to be selectively movable in a first direction between a closed position and an open position relative to the opening. In an exemplary embodiment, the opening is defined in a fixed panel, and the guide rail is affixed in a suitable manner to a face of the fixed panel such that the first guide rail is disposed generally above the opening. A compression or "wiper" seal is provided on one of the sliding panel and the periphery of the opening, by which to achieve an air and/or moisture seal when the sliding panel is in the closed position.

According to an aspect of the invention, the guide rail includes an engagement portion that overlies or "overhangs" an upper portion of the outer face of the sliding panel and engages at least one of the runners and/or the sliding panel's outer face to thereby limit the relative pivoting movement of the sliding panel away from the fixed panel. In an exemplary embodiment, the engagement portion is conveniently defined by a leg of a U-shaped or L-shaped guide rail that continuously overlies the upper portion of the sliding panel's outer face, i.e., whether the sliding panel is in the closed position, in the fully-open position, or in any intermediate partially-open position.

The overhanging engagement portion of the guide rail operates to limit the pivoting movement of the sliding panel in the vehicle's fore/aft direction, i.e., a second direction perpendicular to the first direction of relative sliding movement of the sliding panel relative to the guide rail. Specifically, the overhanging engagement portion of the guide rail prevents the lower portion of the moving panel from moving significantly aft by limiting the extent to which the sliding panel pivots about the upper end of the runner disposed within the guide rail. The overhanging engagement portion of the guide rail further advantageously prevents the upper portion of the sliding panel from moving significantly fore (or aft).

The assembly preferably further includes a latch operates to urge the sliding panel toward the fixed panel as the sliding panel is latched in the closed position, whereupon the sliding panel is pivoted against the fixed panel to thereby compress the seal disposed between the sliding panel and the fixed panel.

In accordance with another aspect of the invention, while the sliding panel can be slightly larger than the opening, whereby a bulb seal is compressed between the respective peripheries of the sliding panel and the opening upon operation of the latch, the sliding panel may alternatively be smaller than the opening and further arranged for articulating movement between a slideable position disposed on one side of the fixed panel, and a flush or recessed position relative to the fixed panel when the sliding panel is moved to its closed position.

From the foregoing, it will be appreciated that the invention advantageously provides a means to eliminate the bottom guide rail, and provides for an "easier" sliding movement of the sliding panel, while simultaneously providing an air and/or water resisting seal to the fixed panel when the sliding panel is latched or otherwise in a closed position. A single guide rail closure panel assembly according to the invention can beneficially be designed for both manual operation of the sliding panel and/or powered operation of the sliding panel.

Other objects, features, and advantages of the present invention will be readily appreciated upon a review of the subsequent description of the preferred embodiment and the appended claims, taken in conjunction with the accompanying Drawings.

BRIEF DESCRIPTION OF THE DRAWINGS

The accompanying Drawings incorporated in and forming a part of the specification illustrate several aspects of the invention and, together with the description, serve to explain the principles of the invention. In the Drawings:

FIG. 1 is an elevational view of an exemplary sliding panel assembly according to the invention;

FIG. 2 is a cross-sectional view taken along line 2—2 of FIG. 1;

FIG. 3 is an enlarged partial elevation of the upper portion of the assembly's sliding panel;

FIG. 4 is an enlarged partial section illustrating the engagement of the sliding panel's runner/sleeve with the guide rail;

FIG. 5 is an enlarged partial elevation of the lower portion of the sliding window, illustrating movement of the sliding window from the unlatched to the latched condition;

FIG. 6 is a partial section of the lower portion of the sliding window, illustrating the relative movement of the latch, taken along line 6—6 of FIG. 5; and FIG. 7 is a partial section of the lower portion of the sliding window, taken along line 7—7 of FIG. 5.

DETAILED DESCRIPTION OF THE INVENTION

Referring to FIG. 1, an exemplary closure panel assembly 10 in accordance with the invention, as may be used as the backlight for a passenger vehicle such as a light truck (not shown), generally includes a fixed panel 12 which defines an opening 14. The fixed panel 12 is preferably formed of a relatively rigid material and, where desired, may be formed of a transparent or translucent material such as a tempered glass that meets any required ANSI and ECE automotive requirements, as illustrated in the Figure. The opening 14 thus provides access to the interior/exterior of the passenger compartment of the vehicle.

The assembly 10 includes a single elongate support or guide rail 16 affixed to the fixed panel 12 immediately above the opening 14. While the invention contemplates affixing or attaching the first guide rail 16 to the fixed panel 12 in any suitable manner, in the assembly 10 illustrated in the Drawings, the guide rail 16 is conveniently affixed to a first face 18 of the fixed panel 12 with a pressure-sensitive adhesive, such as structural bonding tape (not shown). Where desired, the longitudinal ends 20 of the first guide rail 16 are advantageously extended to the edges of the assembly 10, for example, such that the ends 20 are captured in a peripheral injection-molded urethane gasket (not shown), whereby the guide rail 16 is further secured to the vehicle. While the guide rail 16 is formed of any suitable material, in the exemplary assembly 10, the guide rail 16 is conveniently formed as an aluminum extrusion.

Referring again to FIG. 1, the assembly 10 includes a sliding panel 22 supported and suspended by the guide rail 16 for movement in a first direction 24 generally parallel to the guide rail 16, between a closed position substantially covering or in alignment with the opening 14 (illustrated solid lines 26 in FIG. 1) and an open position wherein at least a portion of the opening 14 is exposed (illustrated in broken lines 28 in FIG. 1). As seen in FIG. 2, the guide rail 16 supports the sliding panel 22 such that the sliding panel 22 slides laterally and directly adjacent to the fixed panel 12. Because the assembly's sliding panel 22 is larger than the opening 14 in the fixed panel 12, the sliding panel 22 remains to one side of a first face of the fixed panel 12 in all relative positions.

More specifically, as best seen in FIGS. 3 and 4, a pair of runners 30 are secured to the sliding panel 22 proximate to an upper portion 32 of the sliding panel's outer face 34, for example, using a suitable silicone or urethane adhesive. A tubular sleeve 36 is pivotally attached to the uppermost portion 38 of each runner 30. Each sleeve 36 is slideably received within a complementary longitudinal channel 40 defined in the guide rail 16, such that the sleeve 36 is movable longitudinally within the channel 40 to thereby permit displacement of the sliding panel 22 relative to the opening 14 between the closed position and the open position.

As best seen in FIGS. 2 and 4, a compression seal, such as a bulb seal 42 formed of an extruded EPDM material, is secured about the periphery of the opening 14, as by a suitable adhesive (not shown), with which to achieve an air and/or moisture seal between the fixed panel 12 and the sliding panel 22 when the sliding panel 22 is moved into the closed position. It will be appreciated that the invention contemplates use of other types of compressible seals with which to form a desired seal between the fixed panel 12 and the sliding panel 22, including those seals that are affixed to the sliding panel 22 rather than the periphery of the opening 14.

Also as illustrated in FIG. 4, the assembly's guide rail 16 includes an engagement portion 44 that "overhangs" or overlies the upper portion 32 of the outer face 34 of the sliding panel 22 opposite at least one of the runners 30 and/or the sliding panel's outer face 34. The overhanging engagement portion 44 of the guide rail 16 operates to limit the movement of the sliding panel 22 in the vehicle's fore/aft direction, i.e., a second direction perpendicular to the first direction 24 of relative sliding movement of the sliding panel 22 relative to the guide rail 16. Specifically, the overhanging engagement portion 44 of the guide rail 16 limits the relative fore/aft movement of the lower portion 46 of the sliding panel 22 by limiting the extent to which the sliding panel 22 pivots about the upper end 38 of the runner 30 disposed within the guide rail 16. It will be appreciated that the interlocking design of the exemplary assembly's runner sleeves 36 and the guide rail channel 40 further advantageously serves to limit the fore/aft motion of the upper portion 32 of the sliding panel 22 relative to the bulb seal 42.

In order to reduce wear, a wear strip 47 formed, for example, of Nylon 6/6, is secured as with a suitable adhesive to the upper portion of the sliding panel 22 immediately beneath the runners. The wear strip 47 advantageously eliminates deleterious metal-to-glass engagement between the overhanging portion of the guide rail 16 and the outer face 34 of the sliding panel 22.

As seen in FIGS. 5–7, the exemplary assembly 10 also includes a latch 48 operative to urge the lower portion 46 of the sliding panel 22 towards the fixed panel 12. More specifically, the latch 48 includes a latch handle 50 supported by a latch clevis 52 secured to the lower portion 46 of the sliding panel's outer face 34. The latch 48 also includes a latch lock plate 54 secured to the fixed panel 12 beneath the opening 14. When the sliding panel 22 is in the closed position, the latch 48 operates to urge the lower edge of the sliding panel 22 towards the opening 14 in the fixed panel 12, such that the sliding panel 22 will pivot slightly within in the channel 40 to thereby compress the bulb seal 42 disposed between the sliding panel 22 and the periphery of the opening 14 and, hence, achieve a weather-tight seal.

In accordance with another aspect of the invention, the latch 48 is also operative to secure or "lock" the sliding panel 22 in the closed position relative to the fixed panel 12. Thus, the latch 48 advantageously provides one or more of the following functions: 1) the latch 48 can be used as a handle on the sliding panel; 2) the latch 48 provides a positive lock when the sliding panel 22 is in the closed position and/or one or more other relative panel positions (not shown); and 3) the latch 48 operates to urge the sliding panel 22 against the bulb seal 42 when in the closed position. When the latch 48 is released, the compressive forces against the bulb seal 42 are relieved, allowing for reduced friction sliding motion of the sliding panel 22 relative to the fixed panel opening 14.

While the above description constitutes the preferred embodiment, it will be appreciated that the invention is susceptible to modification, variation and change without departing from the proper scope and fair meaning of the subjoined claims. For example, while the exemplary assembly is described in the context of a light truck backlite, the invention is suitable for use in a variety of applications, including both transportation (e.g., trains, buses, recreational vehicles, and trailers, for example, as a rearward-facing window on other vehicles; as a side window on vans or other vehicles) and non-transportation (e.g., architectural) uses. Similarly, the seals to resist air and/or water penetration between the fixed panel and sliding panel can be attached to either the fixed panel or the sliding panel. And, while the exemplary embodiments include a latch mechanism operative to compress the bulb seal, the invention contemplates use of a powered sliding panel (not shown), which may also include a passive or active device, such as a motor, with which to urge or draw the powered sliding panel against the bulb seal when the sliding panel is moved to the closed position.

And, while the sliding panel 22 of the exemplary assembly 10 is slightly larger than the fixed panel's opening 14, in another contemplated embodiment, the sliding panel is slightly smaller than the opening in the fixed panel, and the engagement of the runners and the guide rail channel provides for an articulating fore/aft motion of the sliding panel relative to the fixed panel in addition to a sliding motion. The articulating motion allows the sliding panel to move at least one of fore or aft relative to the fixed panel, thereby moving the sliding panel between a position directly adjacent the fixed panel and a position in which one or more major surfaces of the sliding panel and the fixed panel are relatively flush with one another. Thus, when the sliding panel is in a position directly adjacent the fixed panel, the sliding panel is movable in the first direction between an open and closed position, as described in the exemplary assembly 10. However, when the sliding panel is articulated to be relatively more flush with the fixed panel, it is generally prevented from sliding movement by the surfaces (and/or any seal provided on such surfaces) that define the opening in the fixed panel. The articulating movement thus acts to provide a relatively flush appearance of the sliding panel relative to the fixed panel, when the sliding glass panel is moved to the closed position and articulated to the flush position.

We claim:

1. A combination of a fixed panel and a closure panel assembly for closing an opening defined in the fixed panel, wherein the assembly comprises:

an elongated guide rail attached to the fixed panel, the guide rail including a channel;

a sliding panel having an upper portion and a lower portion, and a runner attached to the upper portion of the sliding panel, the runner including an upper portion received within the channel a the guide rail for relative sliding movement within the channel, such that the sliding panel is movable between a closed position generally registered with the opening and an open position displaced in a first direction from the closed position;

a seal mounted on one of the sliding panel and a periphery of the opening; and a latch operative to urge the lower portion of the sliding panel toward the fixed panel, where upon the sliding panel pivots about the upper portion of the runner to compress the seal about the periphery of the opening when the sliding panel is moved into the closed position;

wherein the guide rail includes an engagement portion overhanging the upper portion of the sliding panel, and the engagement portion engaging the upper portion of the sliding panel and limiting relative pivoting movement of the lower portion of the sliding panel away from the fixed panel when the sliding panel is in the open position and the engagement portion spaced from the upper portion of the sliding panel when the sliding panel is in the closed position.

2. The combination of claim 1, wherein the channel of the guide rail includes an arcuate surface, and wherein the upper portion of the runner includes a tubular sleeve that is received within the channel.

3. The combination of claim 2, wherein the engagement portion of the guide rail is adjacent to the arcuate surface of the channel.

4. A closure panel assembly adapted to close an opening defined in a fixed panel, the assembly comprising:

an elongated guide rail adapted to be attached to the fixed panel, the guide rail including a channel;

a sliding panel having an upper portion and a lower portion, and a runner attached to the upper portion of the sliding panel, the runner including an upper portion received within the channel of the guide rail for relative sliding movement within the channel, such that the sliding panel is movable between a closed position generally registered with the opening and an open position displaced in a first direction from the closed position;

a seal mounted on the sliding panel; and a latch on the lower portion of the sliding panel, the latch being operative to urge the lower portion of the sliding panel to pivot about the upper portion of the runner when the sliding panel is moved into the closed position, wherein the guide rail includes an engagement portion adjacent to the channel, the engagement portion overhanging the upper portion of the sliding panel, and the engagement portion engaging the upper portion of the sliding, panel at least when the sliding panel is in the open position to thereby limit relative pivoting movement of the lower portion of the sliding panel and the engagement portion spaced from the upper portion of the sliding panel when the sliding panel is in the closed position.

5. The assembly of claim 4, wherein the latch is operative to bias the lower portion of the sliding panel only when the slicing panel is in or near the closed position.

* * * * *

UNITED STATES PATENT AND TRADEMARK OFFICE
CERTIFICATE OF CORRECTION

PATENT NO. : 6,920,719 B2 Page 1 of 1
DATED : July 26, 2005
INVENTOR(S) : Jeffrey G. Bourque et al.

It is certified that error appears in the above-identified patent and that said Letters Patent is hereby corrected as shown below:

<u>Column 6,</u>
Line 53, after "sliding" delete ",".
Line 61, before "panel is" delete "slicing" and substitute -- sliding --.

Signed and Sealed this

Sixteenth Day of May, 2006

JON W. DUDAS
*Director of the United States Patent and Trademark Office*